(12) United States Patent  
Svendsen et al.

(10) Patent No.: US 12,184,312 B2
(45) Date of Patent: *Dec. 31, 2024

(54) ANTENNA BANDWITH ENHANCEMENT FOR AN ELECTRONIC DEVICE

(71) Applicant: Intel Corporation, Santa Clara, CA (US)

(72) Inventors: Simon Svendsen, Aalborg (DK); Ole Jagielski, Viborg (DK)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,951

(22) Filed: Oct. 24, 2023

(65) Prior Publication Data
US 2024/0154631 A1    May 9, 2024

Related U.S. Application Data

(63) Continuation of application No. 16/926,971, filed on Jul. 13, 2020, now Pat. No. 11,799,505, which is a
(Continued)

(51) Int. Cl.
H01Q 1/24    (2006.01)
H01Q 1/38    (2006.01)
H01Q 5/321   (2015.01)
H01Q 5/335   (2015.01)
H01Q 5/50    (2015.01)
H01Q 9/30    (2006.01)
(Continued)

(52) U.S. Cl.
CPC ........... *H04B 1/0064* (2013.01); *H01Q 1/243* (2013.01); *H01Q 1/38* (2013.01); *H01Q 5/321* (2015.01); *H01Q 5/335* (2015.01); *H01Q 5/50* (2015.01); *H01Q 9/30* (2013.01); *H01Q 21/28* (2013.01); *H04B 1/3888* (2013.01); *H04B 1/401* (2013.01)

(58) Field of Classification Search
CPC .... H04B 1/0064; H04B 1/3888; H04B 1/401; H01Q 1/243; H01Q 1/38; H01Q 5/321; H01Q 5/335; H01Q 5/50; H01Q 9/30; H01Q 21/28
See application file for complete search history.

(56) References Cited

U.S. PATENT DOCUMENTS 9,337,539 B1    5/2016  Ananthanarayanan et al.
9,673,520 B2 *  6/2017  Zhang ................ H01Q 1/243
(Continued)

*Primary Examiner* — Hai V Tran
*Assistant Examiner* — Michael M Bouizza
(74) *Attorney, Agent, or Firm* — Banner & Witcoff Ltd.

(57) ABSTRACT

Techniques are disclosed for configuring a broadband antenna system. An example electronic device includes a first antenna operating at a first frequency range and coupled to a first transceiver via a first signal path comprising a first indirect feed. The electronic device also includes a second antenna operating at a second frequency range and coupled to a second transceiver via a second signal path comprising a second indirect feed, wherein the first frequency range is lower than the first frequency range. The electronic device also includes a third antenna operating at the second frequency range and coupled to a third transceiver via a second signal path comprising a third indirect feed. Additionally, the first antenna is coupled to the first antenna and the second antenna by a capacitive coupling element.

31 Claims, 14 Drawing Sheets

Related U.S. Application Data continuation of application No. 15/719,781, filed on Sep. 29, 2017, now Pat. No. 10,715,187.

(51) Int. Cl.
*H01Q 21/28* (2006.01)
*H04B 1/00* (2006.01)
*H04B 1/3888* (2015.01)
*H04B 1/401* (2015.01)

(56) References Cited

U.S. PATENT DOCUMENTS

| | | |
|---|---|---|
| 10,200,092 B1 * | 2/2019 | Irci .......................... H04B 5/48 |
| 10,715,187 B2 | 7/2020 | Svendsen et al. |
| 2010/0302123 A1 | 12/2010 | Knudsen et al. |
| 2014/0139380 A1 * | 5/2014 | Ouyang ................. H01Q 1/243 |
| | | 343/702 |
| 2017/0048363 A1 | 2/2017 | Lee et al. |
| 2019/0027822 A1 | 1/2019 | Ayala Vazquez et al. |
| 2019/0027833 A1 | 1/2019 | Ayala Vazquez et al. |
| 2020/0161755 A1 | 5/2020 | Olesen et al. |

* cited by examiner

100

800

ANTENNA BANDWITH ENHANCEMENT FOR AN ELECTRONIC DEVICE

TECHNICAL FIELD

This disclosure relates generally to portable and mobile computing devices such as laptop computers, tablet computers, smart phones, and the like. More specifically, the disclosure describes techniques for improving antenna bandwidth in such devices.

BACKGROUND

The industrial design of handheld wireless devices will often have a high priority in the overall design process, and full metal bodies are often used for high-end phones to get an appealing industrial design. These types of phones will only have limited space for the antennas in the top and the bottom of the device, making it difficult to design an antenna system with broad bandwidth. Thus, devices such as smart phones are often equipped with narrow-banded tunable antennas where only one or a limited number of adjacent frequency bands are covered at any given time.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for improving or enhancing the bandwidth of antennas or antenna arrays in an antenna system. There are multiple technologies in which broad antenna bandwidth is desirable for improved performance. For example, the 3rd Generation Partnership Project (3GPP) Long Term Evolution (LTE)-Advanced specification provides carrier aggregation, which allows mobile network operators to combine a number of separate LTE carriers to increase user data rates and network capacity. Carrier aggregation can be combined with other techniques such as Quadruple Best Antenna Selection (QBAS) and 4×4 Multiple-Input Multiple-Output (MIMO).

To implement carrier aggregation, the antenna system will sometimes be expected to cover multiple non-adjacent LTE bands, such as the bands referred to herein as LB (699 MHz to 960 MHz), MB (1710 MHz to 2170 MHz), HB (2300 MHz to 2690 MHz), UB (3400 MHz to 3800 MHz), and XB (5150 MHz to 5850 MHz). Four full bandwidth antennas all covering MB, HB, UB and XB frequency bands will be used to combine QBAS and 4×4 MIMO with all carrier aggregation combinations. This will typically require a large volume, when using traditional antenna designs, which is in direct conflict with the industrial design of the device. Even if a large volume was allocated, it would still be difficult to achieve good isolation between the wide-banded high frequency antennas.

The present disclosure describes an antenna system that provides a number of wide-band antennas that are able to fit within a small form factor such as a smart phone or tablet PC. The techniques described herein may be useful for implementing LTE-Advanced carrier aggregation in combination with QBAS and 4×4 MINO. Accordingly, the present description makes reference to the LTE frequency bands. However, it will be appreciated that the present techniques may also be used in other wireless communication standards.

Figure 1:
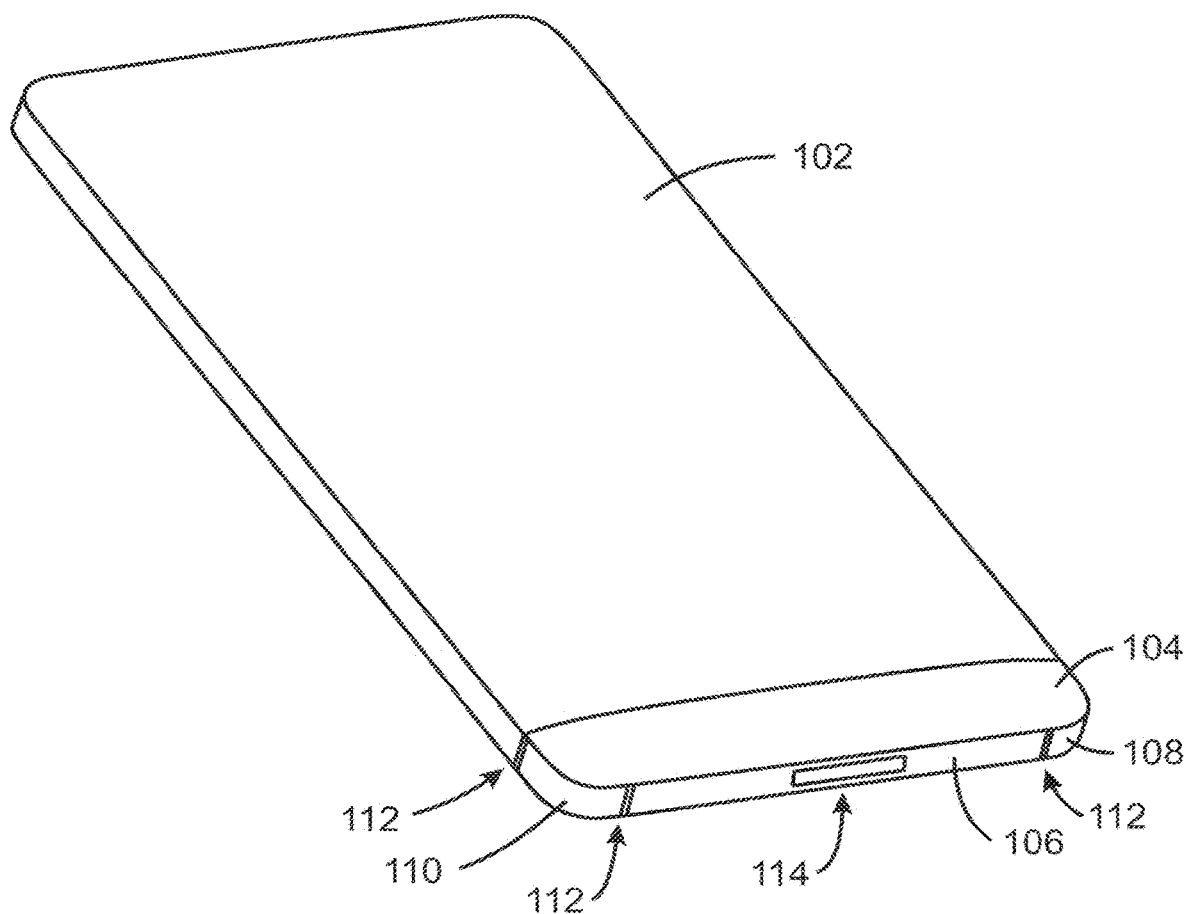
FIG. 1 is a perspective view of an exemplary electronic device such as a smart phone or tablet PC.

FIG. 1 is a perspective view of an electronic device such as a smart phone or tablet PC. The electronic device 100 includes an outer shell 102, the dimensions of which may be primarily determined based on aesthetic considerations, such as the screen size, weight, and others. As an example, the outer shell 102 may have dimensions of 90 millimeters (mm) wide by 190 mm tall by 9.5 mm thick. However, other form factor dimensions may be possible, for example, for smaller smart phones or larger laptops or tablet PCs. The outer shell may be metal.

The outer shell 102 of the device also includes an antenna window 104 which provides an area in and around which antennas can be disposed. The antenna window 104 may be formed of in-molded plastic or other material that is transparent to electromagnetic waves. As shown in FIG. 1, the antenna window 104 may extend the full width of the electronic device 100 and may extend upward by about 15 mm. Other dimensions are also possible.

The electronic device 100 includes a low frequency antenna 106 and two high frequency antennas 108 and 110, all of which are disposed around the outside of the antenna window 104. The two high frequency antennas 108 and 110 are flat metal bars that wrap around respective corners of the electronic device 100. The low frequency antenna 106 is a flat metal bar that forms the bottom surface of the electronic device 100. The antennas 106, 108 and 110 are separated from one another and from the outer shell 102 by gaps 112. The material that forms the antenna window 104 may fill the gaps 112 to maintain the separation. The width of each gap 112 may be approximately 1 mm. In some examples, the low frequency antenna 106 may have an opening 114 suitable for disposing a connector, for example. The connector may be used for coupling the electronic device 100 to a power source and/or other electronic devices.

In some examples, the low frequency antenna 106 is configured to operate at 699 MHz to 960 MHz, and the high frequency antennas 108 and 110 are configured to operate at the MB and HB frequency bands spanning from 1710 MHz to 2690 MHz. Other frequency ranges are possible.

It will be appreciated the antenna systems shown in the present disclosure can be duplicated at the top end of the electronic device 100. For example, the electronic device 100 may also include another antenna window at the top end of the electronic device 100, which may include additional antennas arranged in the mirror image of the antennas at the bottom side of the electronic device 100. Additional features of the antennas are shown in FIGS. 2 and 3.

Figure 2:
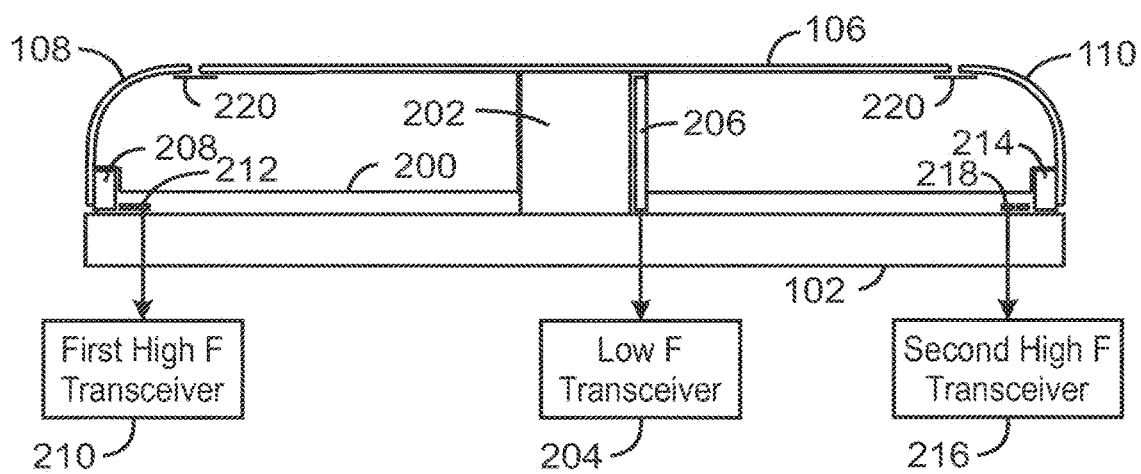
FIG. 2 is a front view of the antenna system of FIG. 1 with the antenna window removed to show additional details.
Figure 3:
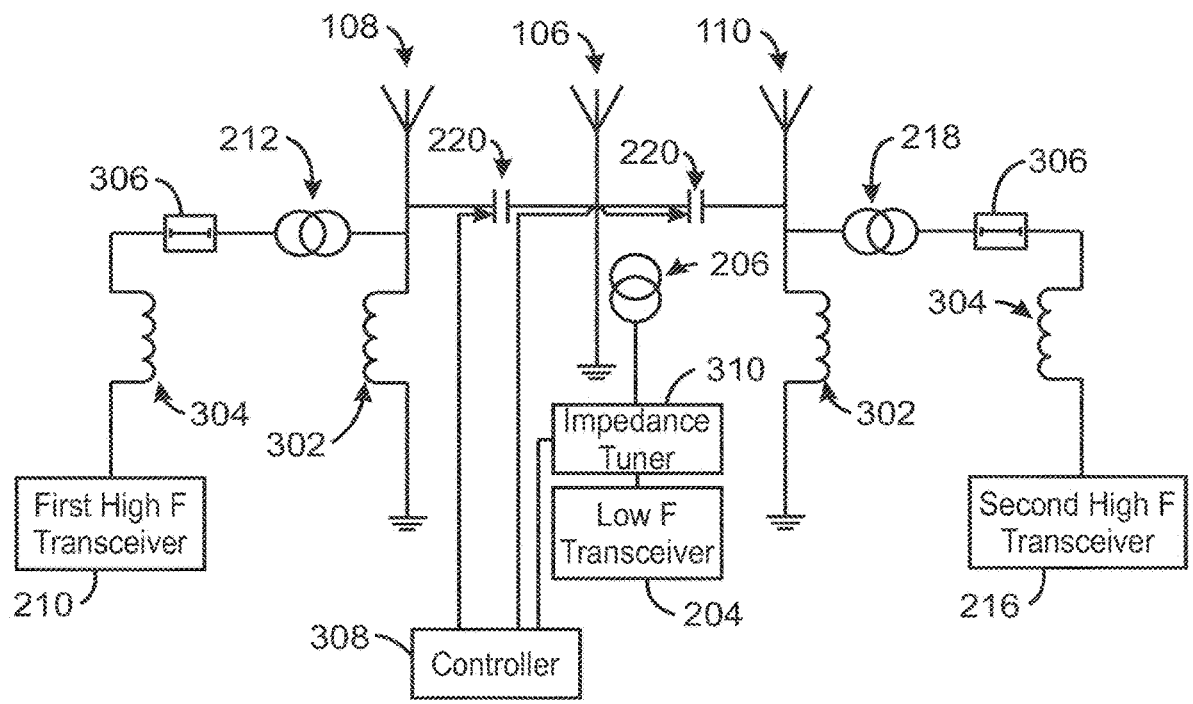
FIG. 3 is a circuit diagram of the antenna system shown in FIGS. 1 and 2.

FIG. 2 is a front view of the antenna system of FIG. 1 with the antenna window removed to show additional details. As shown in FIG. 2, the antenna system components may be disposed on a supporting substrate 200 such as a Printed Circuit Board (PCB). The substrate 200 can also include electrical connections from the one or more communications subsystems to the antennas. The low frequency antenna 106 is coupled to ground through a grounding element 202, and coupled to a low frequency transceiver 204 through an indirect feed element 206. The indirect feed elements shown in FIG. 2 are capacitive feed elements. However, in some embodiments, the indirect feed elements may be inductive feed elements.

The first high frequency antenna 108 is coupled to ground through a grounding element 208. The first high frequency antenna 108 is also coupled to a first high frequency transceiver 210 through an indirect feed element 212. Similarly, the second high frequency antenna 110 is coupled to ground through a grounding element 214, and to a second high frequency transceiver 216 through an indirect feed element 218. The grounding elements 202, 208 and 214 may couple the respective antenna to ground directly or may couple the respective antenna to ground through a passive circuit element such as an inductor. Each transceiver may be a circuit module mounted on the circuit board that provides integrated transmission and reception capabilities. However, the term transceiver as used herein more broadly refers to a circuit module that can provide reception capability, or transmission capability, or both.

The antenna system also includes a pair of coupling capacitors 220 that couple the high frequency antennas 108 and 110 to the low frequency antenna 106. This enables the low frequency antenna to operate in a dual-loop mode, wherein the path of the current is through the low frequency antenna 106 and both high frequency antennas 108 and 110. Thus, the two high frequency antennas are a part of the resonant structure by which the low frequency transmissions are radiated. Each of the two high frequency antennas 108 and 110 operate in a monopole mode.

In some examples, the low frequency antenna 106 is configured to cover the low band frequencies in two switch stages. For example, the first switch stage may cover a frequency range of 699 to 790 MHz while the second switch stage may cover a frequency range of 791 to 960 MHz. The two switch stages may be selected by controlling the capacitance values of the capacitors 220 to change the resonance of the low frequency antenna 106 (including antenna elements 108 and 110).

The two capacitors 220 may be positioned at a points on the antenna elements where the currents for the full high frequency range is very low. This means that the resonances for the low frequency range can be tuned by changing the capacitor values without significantly affecting the currents for the two individual high frequency monopole modes, whereby the high frequency resonances are independent of the low frequency range resonances.

FIG. 3 is a circuit diagram of the antenna system shown in FIGS. 1 and 2. As shown in FIG. 3, the low frequency antenna 106 is coupled to the low frequency transceiver 204 through the indirect feed element 206, high frequency antenna 108 is coupled to the first high frequency transceiver 210 through the indirect feed element 212, and high frequency antenna 110 is coupled to the second high frequency transceiver 216 through the indirect feed element 218. The high frequency antennas 108 and 110 are coupled to ground through resonance inductors 302. The resonance inductors 302 are configured to tune the resonant frequency of the high frequency antennas 108 and 110 and may have an inductance value in the range of 1.4 nanoHenry (nH) to around 10 nH.

The feed path for the high frequency antennas 108 and 110 also include discrete inductors 304 and delay lines 306. The discrete inductors 304 impedance match the output of the transceivers 210 and 216 to the antennas 108 and 110 and may have inductance values in the range of 2 nH to about 20 nH. The delay lines 306 are used to shift the phase into the correct position on the Smith Chart for the discrete inductors 304 to improve the impedance match of the antenna. For example, the delay lines 306 and discrete inductors 304 may provide an impedance match resulting in a return loss of about −6 dB.

Additionally, the low frequency antenna 106 is coupled to the high frequency antennas 108 and 110 through capacitors 220. As mentioned above, the capacitors 220 may be adjustable to implement the two switch stages of the low frequency antenna 106. Accordingly, the capacitors 220 may be coupled to an antenna system controller 308 configured to vary the capacitance of the capacitors 220.

The antenna system may also include an impedance tuner 310 at the output of the low frequency transceiver 204. The impedance tuner 310 is configured to impedance match the low frequency transceiver 204 to the low frequency antenna 106. The impedance tuner 310 may be coupled to the antenna system controller 308 and configured to tune the impedance in response to the changes in the switch stage selection.

Figure 4:
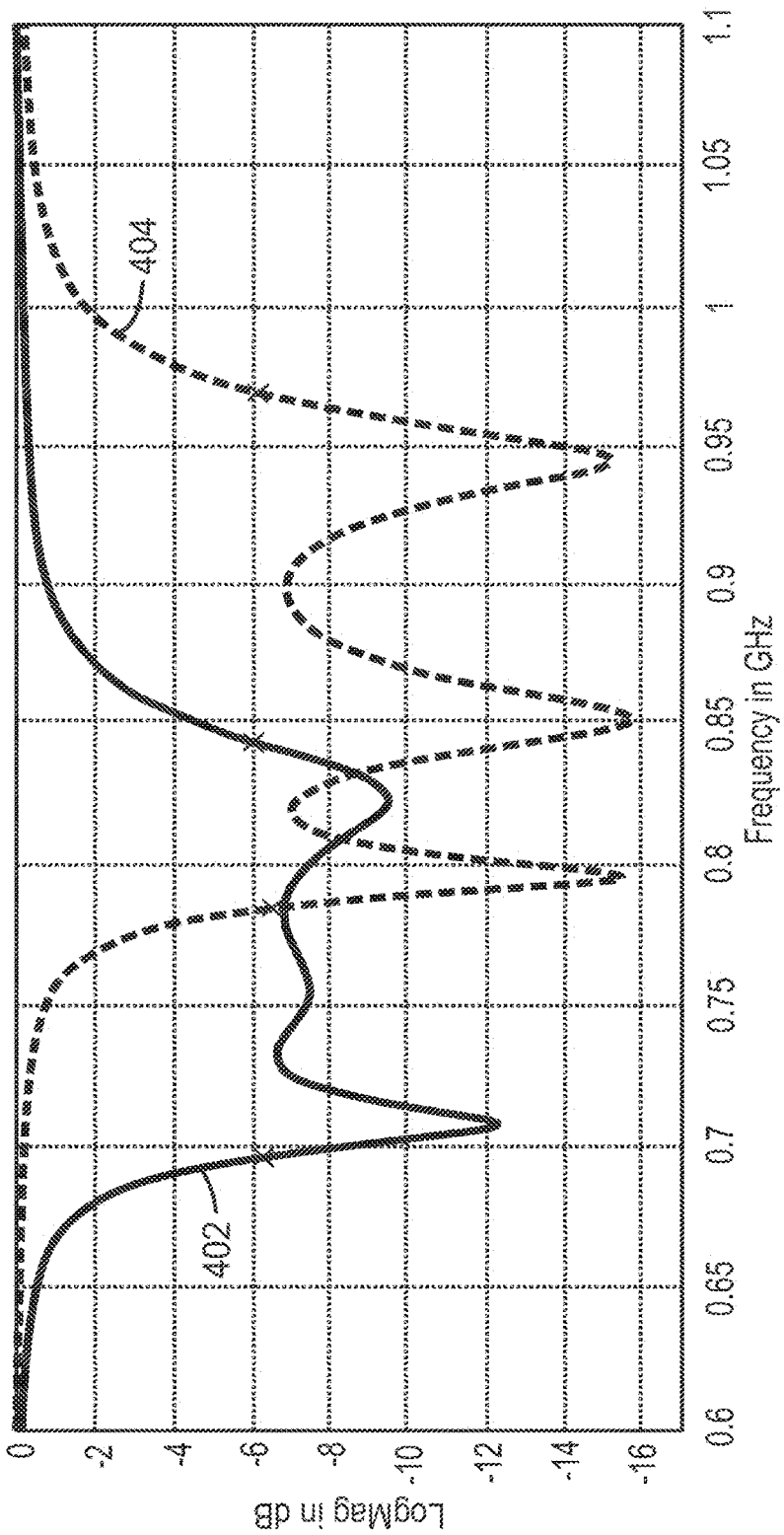
FIG. 4 is a graph illustrating simulated impedance characteristics for the low frequency antenna shown in FIGS. 1 and 2.

FIGS. 4-7 illustrate some of the electrical characteristics of the antenna system shown in FIGS. 1 and 2. FIG. 4 is a graph illustrating simulated impedance characteristics for the low frequency antenna shown in FIGS. 1 and 2. The vertical axis represents the reflection coefficient, S11, in Log magnitude as seen at the low frequency transceiver 204 (FIG. 2). The graph illustrates that the frequency band of 699 MHz to 960 MHz is covered in two switch stages. The first switch stage is represented by line 402, and the second switch stage is represented by line 404. By using two switch stages, a reflection coefficient of less than −6 decibels (dB) can be achieved across the entire low frequency band.

Figure 5:
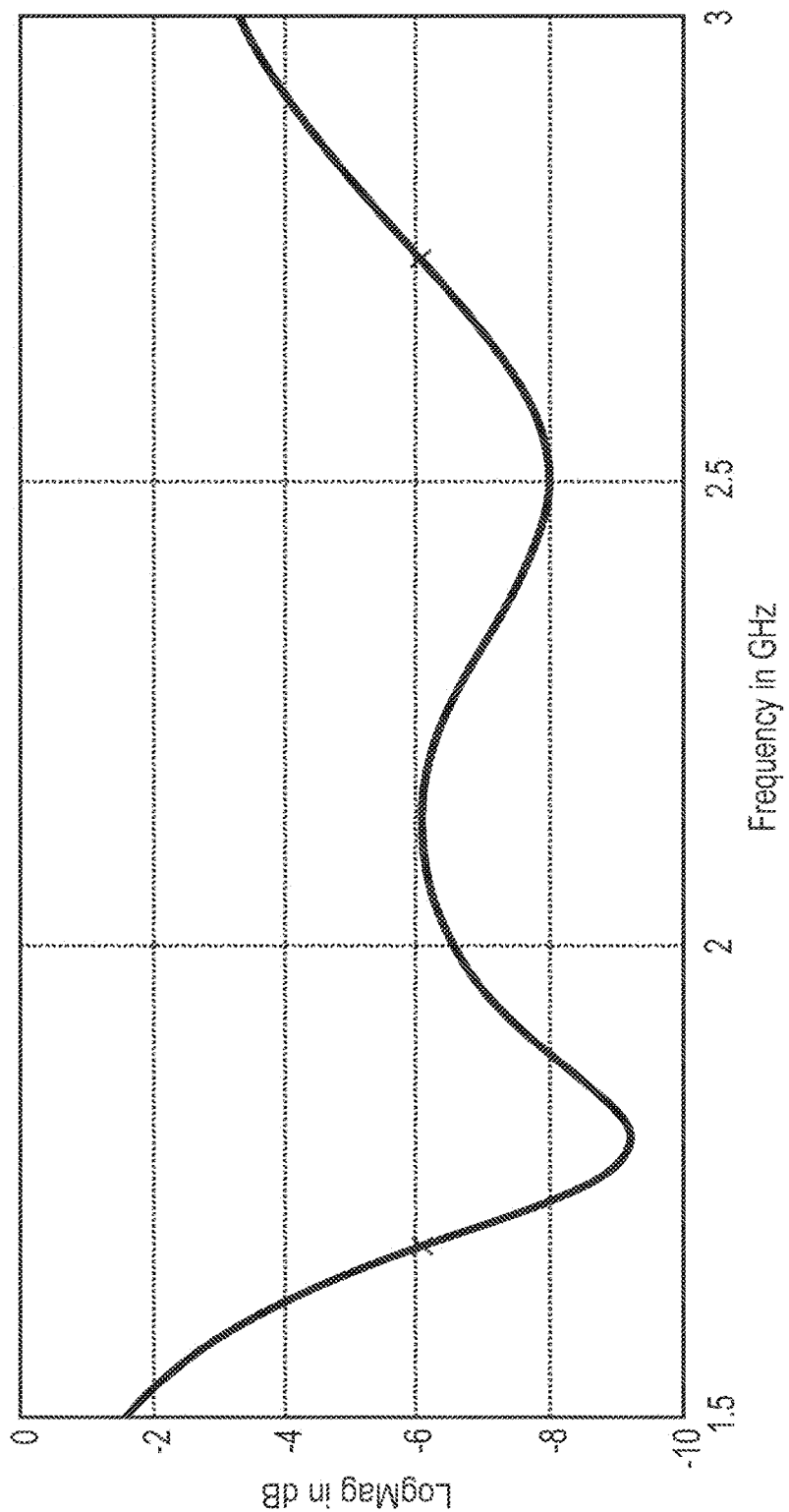
FIG. 5 is a graph illustrating simulated impedance characteristics for the first high frequency antenna shown in FIGS. 1 and 2.

FIG. 5 is a graph illustrating simulated impedance characteristics for the first high frequency antenna shown in FIGS. 1 and 2. In this embodiment, the first high frequency antenna is configured to operate at the MB and HB frequency bands spanning from 1710 MHz to 2690 MHz. As shown in FIG. 5, a reflection coefficient of less than −6 decibels (dB) can be achieved across the both frequency bands.

Figure 6:
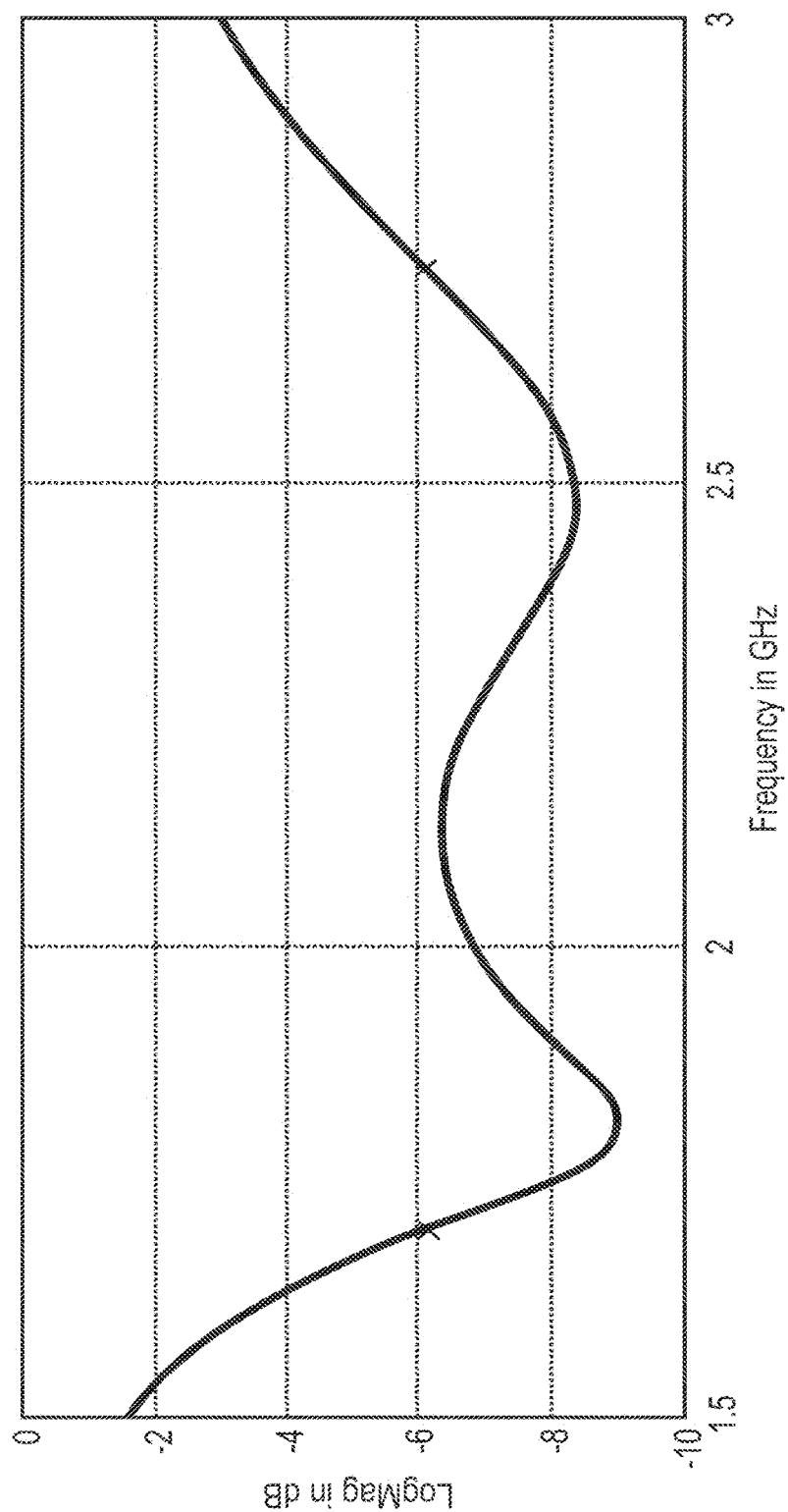
FIG. 6 is a graph illustrating simulated impedance characteristics for the second high frequency antenna shown in FIGS. 1 and 2.

FIG. 6 is a graph illustrating simulated impedance characteristics for the second high frequency antenna shown in FIGS. 1 and 2. In this embodiment, the second high frequency antenna is configured to operate at the MB and HB frequency bands spanning from 1710 MHz to 2690 MHz. As shown in FIG. 6, a reflection coefficient of less than −6 decibels (dB) can be achieved across both frequency bands.

Figure 7:
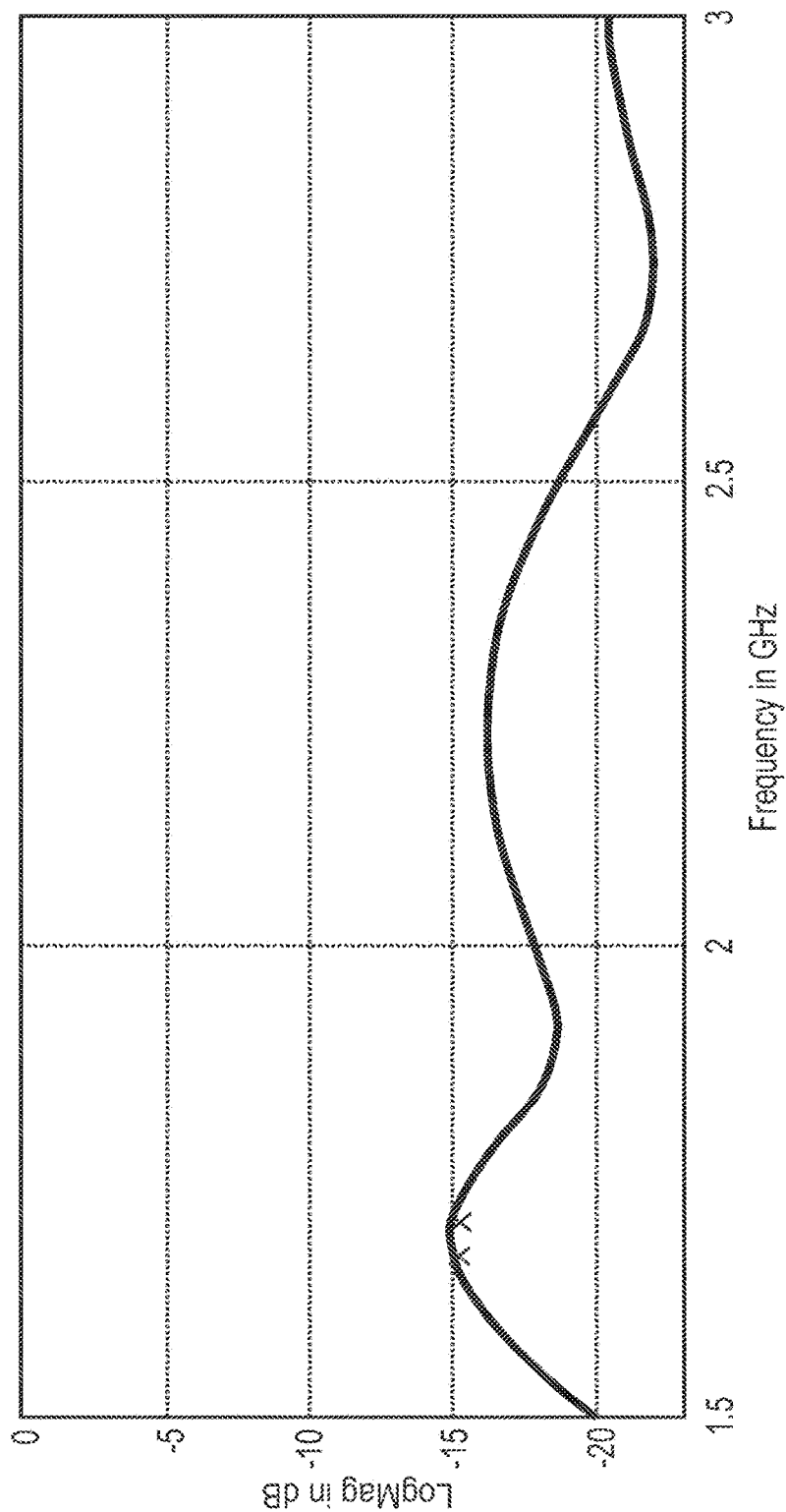
FIG. 7 is a graph illustrating simulated isolation levels between the two high frequency antennas shown in FIG. 7.

FIG. 7 is a graph illustrating simulated isolation levels between the two high frequency antennas shown in FIG. 7. Specifically, the graph of FIG. 7 shows the log magnitude signal level, S21, received at one high frequency antenna from the other high frequency antenna. FIG. 7 demonstrates that a suitable isolation level of greater than −15 dB can be achieved across the entire frequency band of the high frequency antennas.

Figure 8:
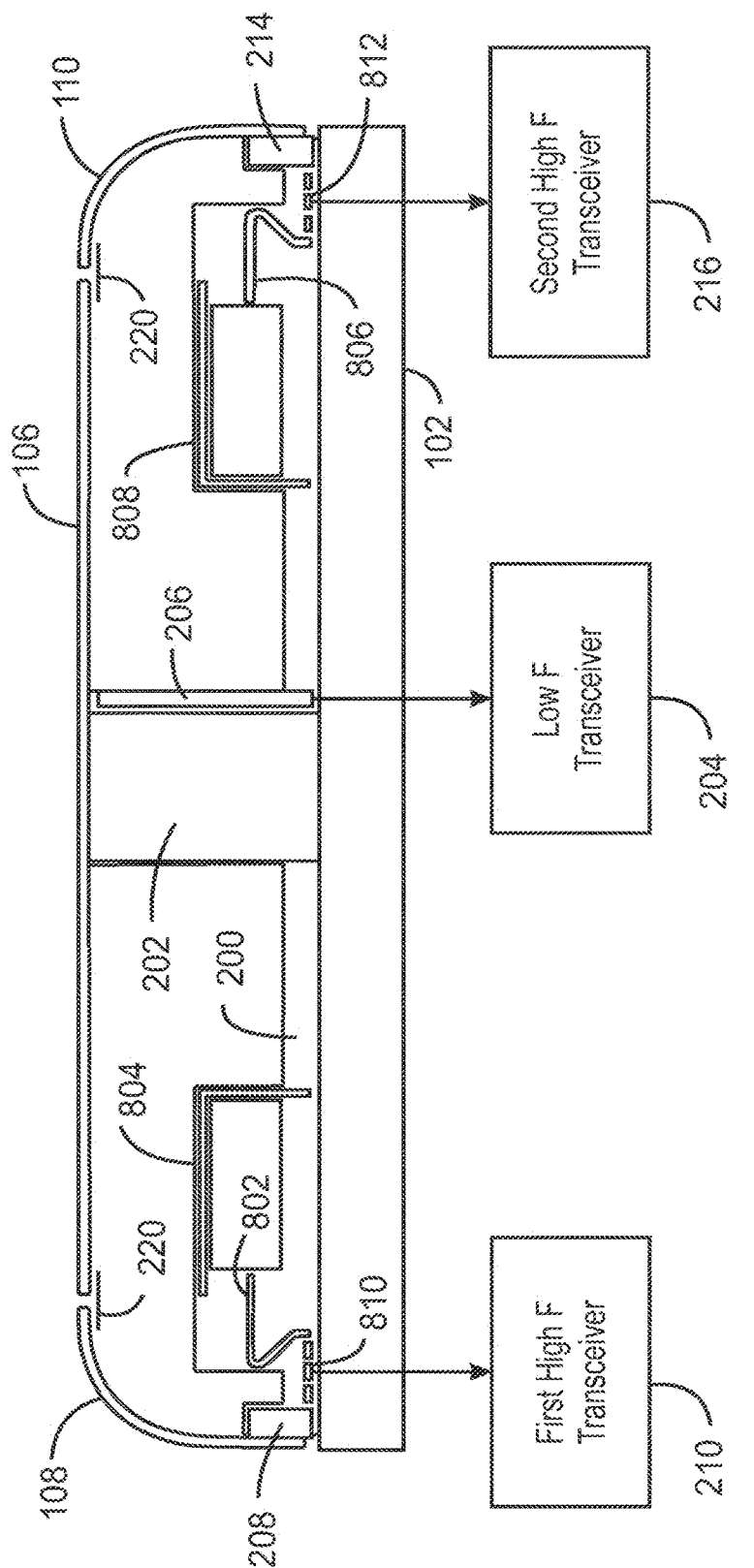
FIG. 8 is another embodiment of an antenna system in accordance with embodiments of the present techniques.

FIG. 8 is another embodiment of an antenna system in accordance with embodiments of the present techniques. In the embodiment shown in FIG. 8, the low frequency antenna 106 operates as described in relation to FIG. 2. The high frequency antennas include the antenna elements 108 and 110 which are configured to resonate at the MB and HB frequency bands as described in relation to FIG. 2. In addition, the two high frequency antennas include additional antenna elements configured to resonate at the UB and XB frequency bands. The XB antenna elements 802 and 806 are configured to resonate at the UB frequency band (5150 to 5850 MHz), and the UB antenna elements 804 and 808 are configured to resonate at the XB frequency band (3400 to 3800 MHz). The high frequency antenna elements 108 and 802 are fed by the indirect feed element 810, and the high frequency antenna elements 110 and 806 are fed by the indirect feed element 812. Antennas elements 804 and 808 are parasitic elements that are driven by antenna elements 802 and 806 respectively.

Figure 9:
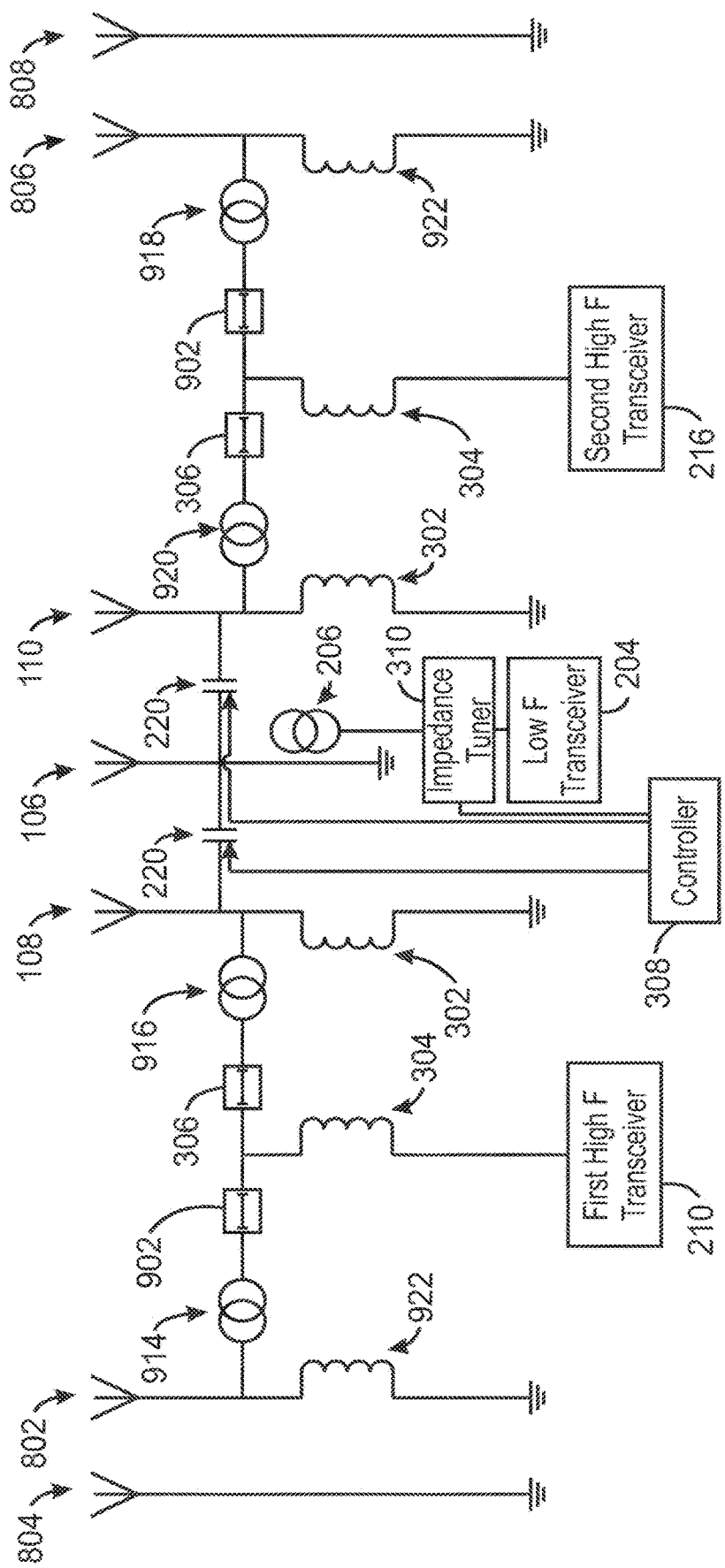
FIG. 9 is a circuit diagram of the antenna system shown in FIG. 8.

FIG. 9 is a circuit diagram of the antenna system shown in FIG. 8. In this embodiment, the circuit includes the low frequency antenna 106, the high frequency antenna elements 108 and 110, and the various circuit components related to the operation of those antennas, which were described above in relation to FIG. 3.

In addition, the XB antenna element 802 is coupled to the first high frequency transceiver 210 through the discrete inductor 304, an additional delay line 902, and an indirect feed 914. The high frequency antenna element 108 is coupled to the first high frequency transceiver 210 through the discrete inductor 304, delay line 306, and an indirect feed 916. The indirect feeds 914 and 916 correspond with the indirect feed element 810 shown in FIG. 8. The XB antenna element 802 is coupled to ground through an additional resonant inductor 922. The UB antenna element 804 is in this embodiment is coupled directly to ground but could also be coupled to ground via a resonance inductor and is driven by the XB antenna element 802. Similarly, the XB antenna element 806 is coupled to the second high frequency transceiver 216 through the discrete inductor 304, an additional delay line 902, and an indirect feed 918. The XB antenna element 806 is coupled to ground through an additional resonant inductor 922. The high frequency antenna element 110 is coupled to the first high frequency transceiver 210 through the discrete inductor 304, delay line 306, and an indirect feed 920. The indirect feeds 918 and 920 correspond with the indirect feed element 812 shown in FIG. 8. The UB antenna element 808 is, in this embodiment, coupled directly to ground but could also be coupled to ground via a resonance inductor and is driven by the XB antenna element 806.

Figure 10:
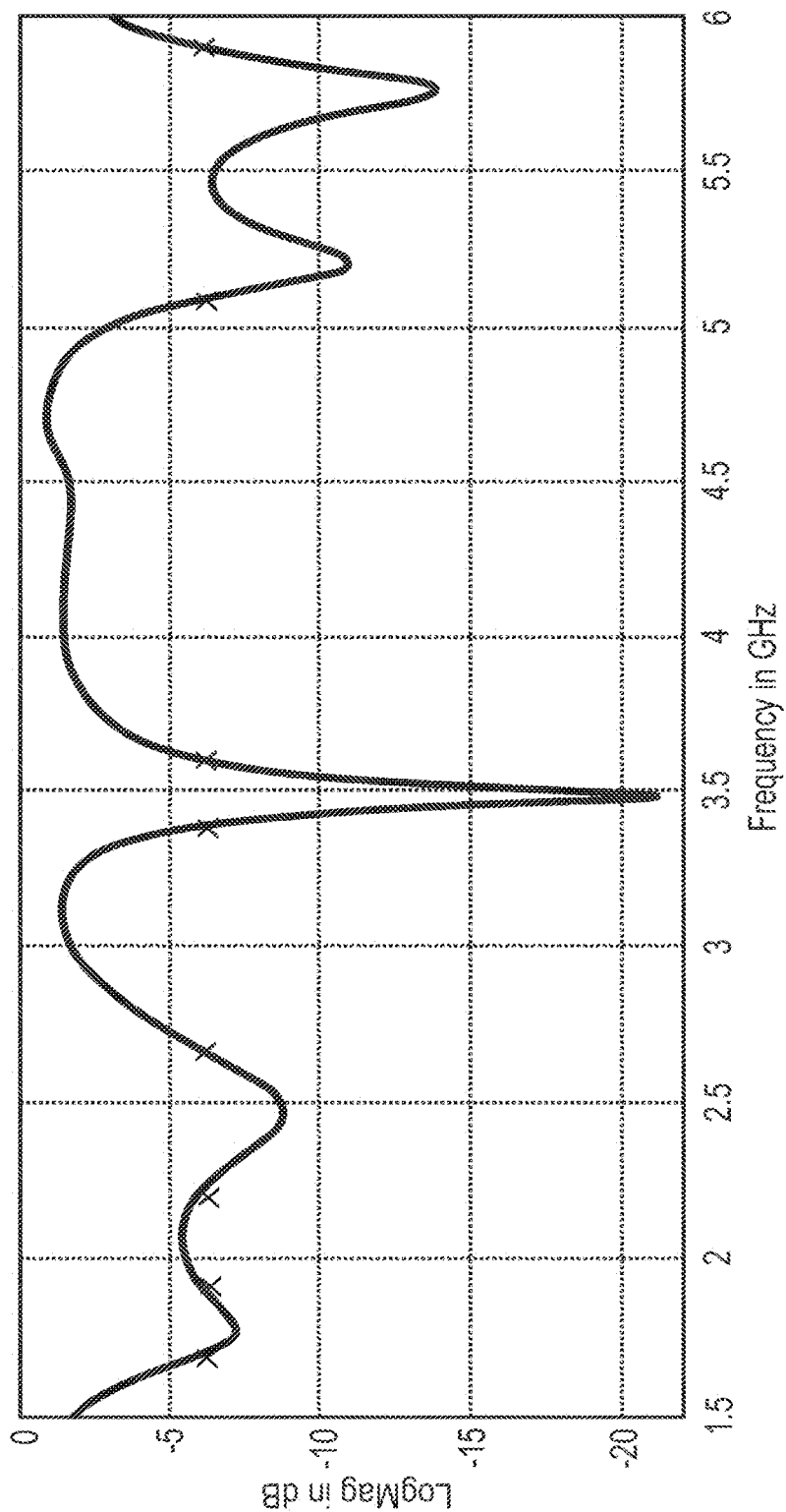
FIG. 10 is a graph illustrating simulated impedance characteristics for the first high frequency antenna shown in FIGS. 8 and 9.
Figure 11:
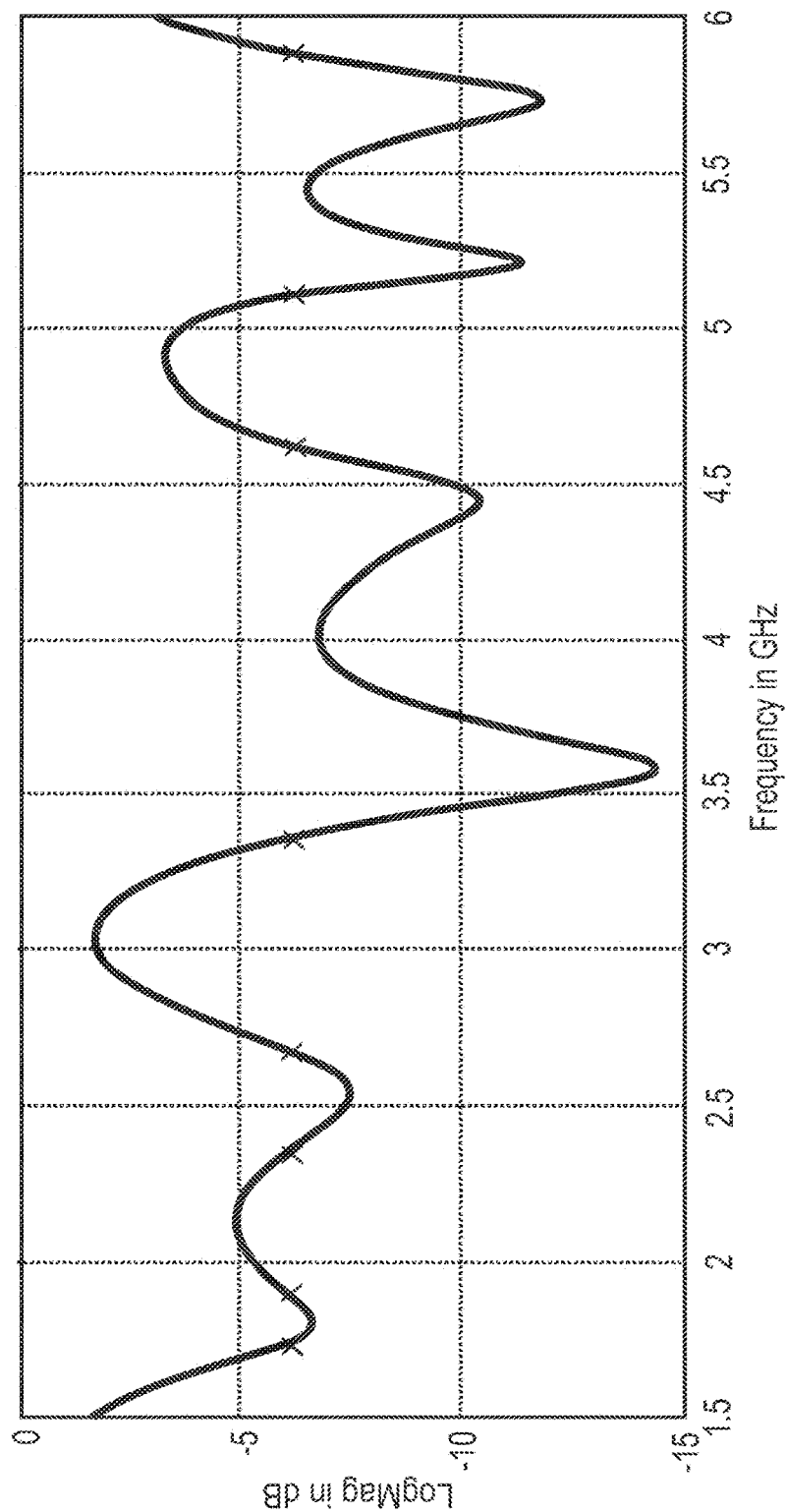
FIG. 11 is a graph illustrating simulated impedance characteristics for the second high frequency antenna shown in FIGS. 8 and 9.
Figure 12:
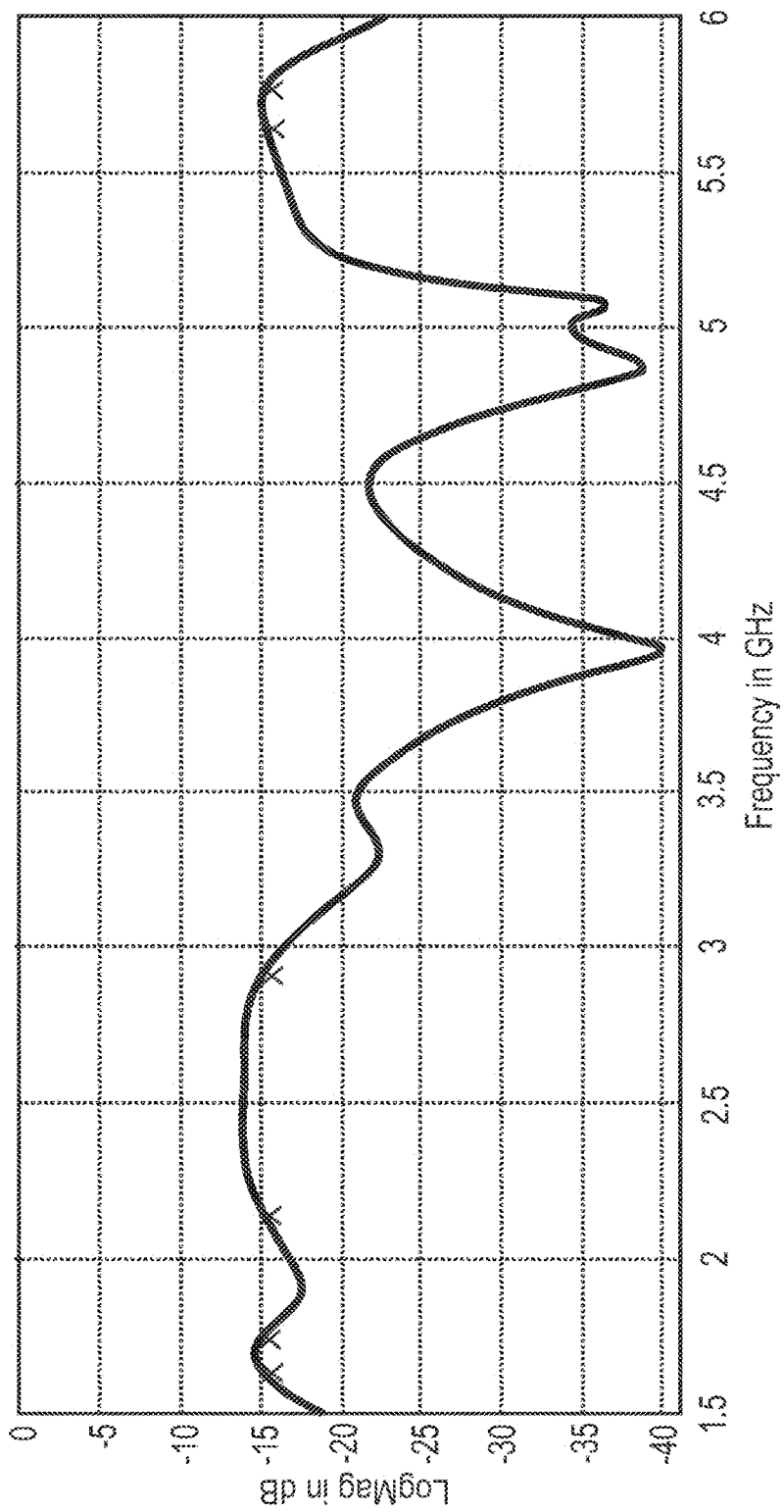
FIG. 12 is a graph illustrating simulated isolation levels between the two high frequency antennas shown in FIGS. 8 and 9.

FIGS. 10-12 illustrate some of the electrical characteristics of the antenna system shown in FIGS. 8 and 9. In this embodiment, the impedance characteristics of the low frequency antenna are substantially the same as shown in FIG. 4, indicating that the additional high frequency antenna elements 802, 804, 806, and 808 have little impact on the performance of the low frequency antenna.

FIG. 10 is a graph illustrating simulated impedance characteristics for the first high frequency antenna shown in FIGS. 8 and 9. In this embodiment, the first high frequency antenna is configured to operate at the MB, HB, UB, and XB frequency bands spanning from 1710 MHz to 5850 MHz. As shown in FIG. 10, a reflection coefficient of less than −6 decibels (dB) can be achieved across the most of the LTE frequency bands and the 5.6 GHz WLAN frequency band.

FIG. 11 is a graph illustrating simulated impedance characteristics for the second high frequency antenna shown in FIGS. 8 and 9. In this embodiment, the second high frequency antenna is configured to operate at the MB, HB, XB, and UB frequency bands spanning from 1710 MHz to 5850 MHz. As shown in FIG. 10, a reflection coefficient of less than −6 decibels (dB) can be achieved across the all of the LTE frequency bands and the 5.6 GHz WLAN frequency band.

FIG. 12 is a graph illustrating simulated isolation levels between the two high frequency antennas shown in FIGS. 8 and 9. Specifically, the graph of FIG. 12 shows the log magnitude signal level, S21, received at one high frequency antenna from the other high frequency antenna. FIG. 12 demonstrates that a suitable isolation level of greater than −14 dB can be achieved across the entire frequency band of the high frequency antennas.

Figure 13:
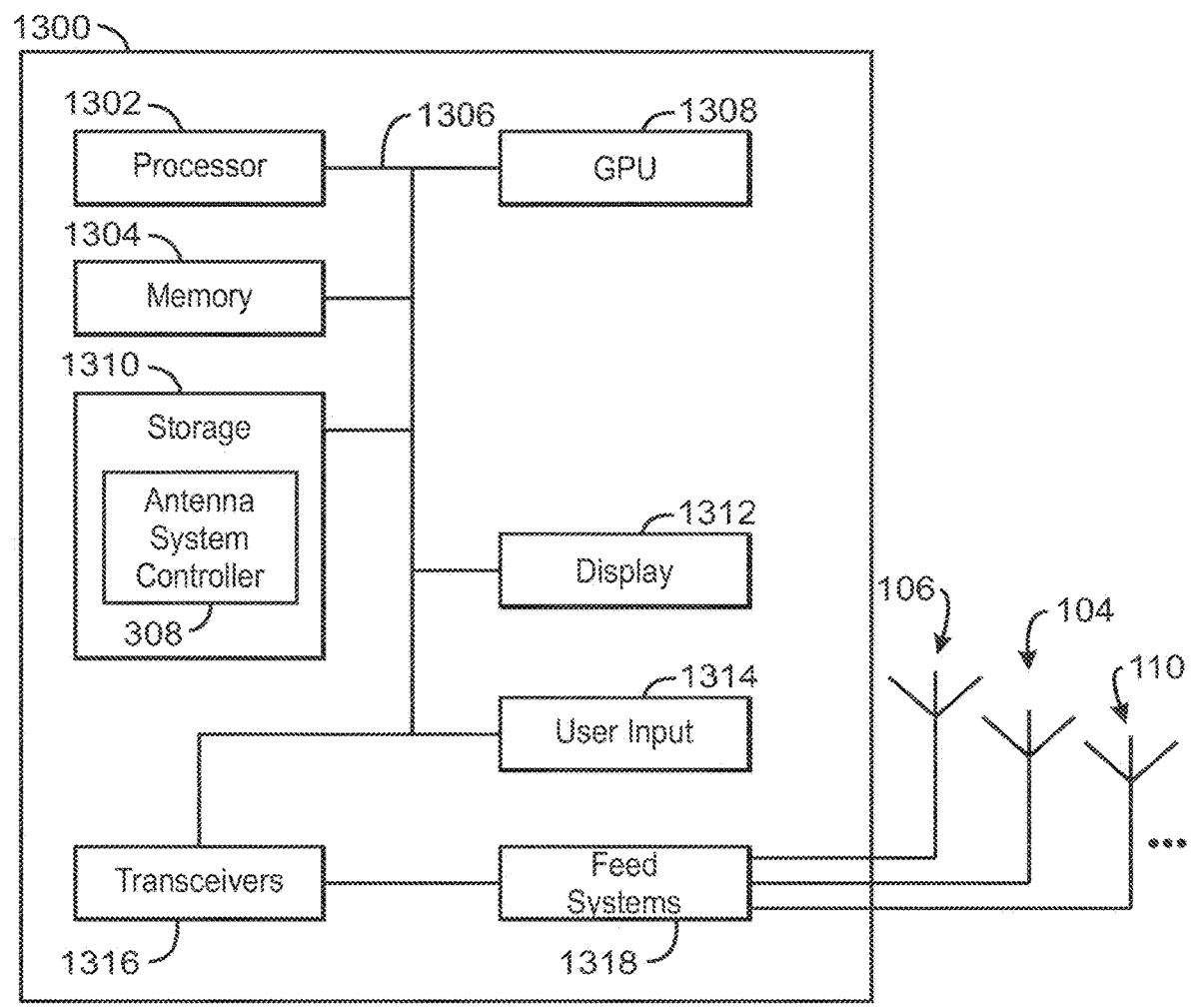
FIG. 13 is a block diagram of an electronic device with a multiple high bandwidth antenna systems.

FIG. 13 is a block diagram of an electronic device with a multiple high bandwidth antenna systems. The electronic device 1300 may be, for example, a tablet computer, mobile phone, smart phone, or a smart watch, among others. The electronic device 1300 may include a central processing unit (CPU) 1302 that is configured to execute stored instructions, as well as a memory device 1304 that stores instructions that are executable by the CPU 1302. The CPU may be coupled to the memory device 1304 by a bus 1306. Additionally, the CPU 1302 can be a single core processor, a multi-core processor, a computing cluster, or any number of other configurations. Furthermore, the electronic device 1300 may include more than one CPU 1302. The memory device 1304 can include random access memory (RAM), read only memory (ROM), flash memory, or any other suitable memory systems. For example, the memory device 1304 may include dynamic random access memory (DRAM).

The electronic device 1300 may also include a graphics processing unit (GPU) 1308. As shown, the CPU 1302 may be coupled through the bus 1306 to the GPU 1308. The GPU 1308 may be configured to perform any number of graphics operations within the electronic device 1300. For example, the GPU 1308 may be configured to render or manipulate graphics images, graphics frames, videos, or the like, to be displayed to a user of the electronic device 1300.

The electronic device 1300 can also include a storage device 1310. The storage device 1310 is a non-volatile physical memory such as a hard drive, an optical drive, a flash drive, an array of drives, or any combinations thereof. The storage device 1310 can store user data, such as audio files, video files, audio/video files, and picture files, among others. The storage device 1310 can also store programming code such as device drivers, software applications, operating systems, and the like. The programming code stored to the storage device 1310 may be executed by the CPU 1302, GPU 1308, or any other processors that may be included in the electronic device 1300.

The electronic device 1300 can also include a display 1312 and one or more user input devices 1314, such as switches, buttons, a keyboard, a mouse, or trackball, among others. One of the input devices 1314 may be a touchscreen, which may be integrated with the display 1312.

The electronic device 1300 also includes transceivers 1316 and feed system 1318. The transceivers 1316 may be any of the low frequency and high frequency transceivers described above in FIGS. 3 and 9. Similarly, the feed systems 1318 may be any of the feed systems described above in relation to FIGS. 3 and 9.

The programming code stored to the storage device 1310 may include the antenna system controller 308. As described above, the antenna system controller 308 may be configured to control the impedance tuner 310 (FIGS. 3 and 9) to tune the low frequency antenna in response to changing conditions. The antenna system controller 308 may also be configured to select a switch stage for the low frequency antenna by sending a tuning signal to the capacitors 220 (FIGS. 3 and 9). In some examples, rather than being implemented as programming code stored to the storage device 1310, the antenna system controller 308 may be implemented as firmware or logic circuits included in one or more dedicated processors such as an Application Specific Integrated Circuit (ASIC), a Field Programmable Gate Array (FPGA), a System on a Chip (SOC), and combinations thereof.

The block diagram of FIG. 13 is not intended to indicate that the electronic device 1300 is to include all of the components shown in FIG. 13. Rather, the electronic device 1300 can include fewer or additional components not shown in FIG. 13, depending on the details of the specific implementation. Furthermore, any of the functionalities of the CPU 1302, or the GPU 1308 may be partially, or entirely, implemented in hardware and/or in a processor. For example, the functionality may be implemented in any combination of Application Specific Integrated Circuits (ASICs), Field Programmable Gate Arrays (FPGAs), logic circuits, and the like.

Figure 14:
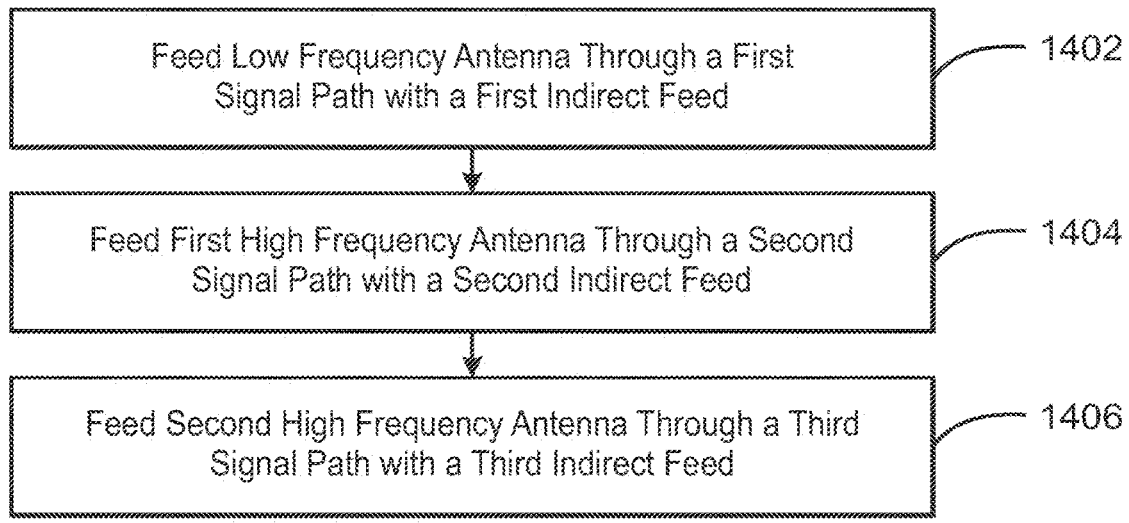
FIG. 14 is a process flow diagram of an example method of operating an electronic device with multiple high bandwidth antenna systems.

FIG. 14 is a process flow diagram of an example method of operating an electronic device with multiple high bandwidth antenna systems. The method 1400 may be performed by the electronic device 1300 and implemented by circuitry included in the transceivers 1316, the feed system 1318, and the antenna system controller 308. The circuitry may be embodied in hardware, such as logic circuitry or one or more processors configured to execute instructions stored in a non-transitory, computer-readable medium.

At block 1402, a low frequency antenna is through a first signal path with a first indirect feed. At block 1404, a first high frequency antenna is fed through a second signal path with a second indirect feed. At block 1406, a second high frequency antenna is fed through a third signal path with a third indirect feed. The first antenna may be coupled to the second antenna and the third antenna through capacitive coupling elements.

The method 1400 should not be interpreted as meaning that the blocks are necessarily performed in the order shown. Furthermore, fewer or greater actions can be included in the method 1400 depending on the design considerations of a particular implementation.

Examples

Example 1 is an electronic device with a broadband antenna system. The electronic device includes a first antenna to operate at a first frequency range and coupled to a first transceiver through a first signal path including a first indirect feed. The electronic device also includes a second antenna to operate at a second frequency range and coupled to a second transceiver through a second signal path including a second indirect feed, wherein the first frequency range is lower than the second frequency range. The electronic device also includes a third antenna to operate at the second frequency range and coupled to a third transceiver through a third signal path including a third indirect feed. The first antenna is coupled to the second antenna and the third antenna through capacitive coupling elements.

Example 2 includes the electronic device of example 1, including or excluding optional features. In this example, the first antenna is to operate in a dual loop mode through the second antenna and the third antenna.

Example 3 includes the electronic device of any one of examples 1 to 2, including or excluding optional features. In this example, the capacitive coupling elements are tunable to adjust a resonant frequency of the first antenna.

Example 4 includes the electronic device of any one of examples 1 to 3, including or excluding optional features. In this example, the first frequency range of the first antenna is covered in two switch stages, which are selectable by adjustment of the capacitive coupling elements.

Example 5 includes the electronic device of any one of examples 1 to 4, including or excluding optional features. In this example, the first frequency range of the first antenna is between 699 MHz and 960 MHz.

Example 6 includes the electronic device of any one of examples 1 to 5, including or excluding optional features. In this example, the second antenna includes a single resonant element configured to resonate at a frequency range between 1710 MHz and 2690 MHz.

Example 7 includes the electronic device of any one of examples 1 to 6, including or excluding optional features. In this example, the second antenna includes a first element configured to resonate at a frequency range between 1710 MHz and 2690 MHz, and a second element configured to resonate at a frequency range between 3400 and 3800 MHz.

Example 8 includes the electronic device of any one of examples 1 to 7, including or excluding optional features. In this example, the second antenna includes: a first element configured to resonate at a frequency range between 1710 MHz to 2690 MHz; a second element configured to resonate at a frequency range between 3400 and 3800 MHz; and a third element configured to resonate at a frequency range between 5150 and 5850 MHz. Optionally, the first element and second elements are coupled to an indirect feed, and the third element is fed by the second element.

Example 9 includes the electronic device of any one of examples 1 to 8, including or excluding optional features. In this example, the first antenna includes a straight metal bar disposed along a first surface of the electronic device; the second antenna includes a first curved metal bar disposed around a first corner of the electronic device adjacent to the first surface; and the third antenna includes a second curved metal bar disposed around a second corner of the electronic device adjacent to the first surface.

Example 10 is a method of operating an electronic device with a broadband antenna system. The method includes feeding a first antenna at a first frequency range through a first signal path including a first indirect feed; feeding a second antenna at a second frequency range through a second signal path including a second indirect feed, wherein the first frequency range is lower than the second frequency range; and feeding a third antenna at the second frequency range through a third signal path including a third indirect feed. The first antenna is coupled to the second antenna and the third antenna through capacitive coupling elements.

Example 11 includes the method of example 10, including or excluding optional features. In this example, the first antenna operates in a dual loop mode through the second antenna and the third antenna.

Example 12 includes the method of any one of examples 10 to 11, including or excluding optional features. In this example, the method includes adjusting a capacitance of the capacitive coupling elements to adjust a resonant frequency of the first antenna.

Example 13 includes the method of any one of examples 10 to 12, including or excluding optional features. In this example, the method includes selecting a first switch stage of the first antenna by selecting a first capacitance level of the capacitive coupling elements; and selecting a second switch stage of the first antenna by selecting a second capacitance level of the capacitive coupling elements.

Example 14 includes the method of any one of examples 10 to 13, including or excluding optional features. In this example, the first frequency range of the first antenna is between 699 MHz to 960 MHz.

Example 15 includes the method of any one of examples 10 to 14, including or excluding optional features. In this example, the second antenna includes a single resonant element configured to resonate at a frequency range between 1710 MHz and 2690 MHz.

Example 16 includes the method of any one of examples 10 to 15, including or excluding optional features. In this example, the second antenna includes a first element configured to resonate at a frequency range between 1710 MHz and 2690 MHz, and a second element configured to resonate at a frequency range between 3400 and 3800 MHz.

Example 17 includes the method of any one of examples 10 to 16, including or excluding optional features. In this example, the second antenna includes: a first element configured to resonate at a frequency range between 1710 MHz to 2690 MHz; a second element configured to resonate at a frequency range between 3400 and 3800 MHz; and a third element configured to resonate at a frequency range between 5150 and 5850 MHz. Optionally, the method includes feeding the first element and second element through the second indirect feed, and feeding the third element through the second element.

Example 18 includes the method of any one of examples 10 to 17, including or excluding optional features. In this example, the first antenna includes a straight metal bar disposed along a first surface of the electronic device. Additionally, the second antenna includes a first curved metal bar disposed around a first corner of the electronic device adjacent to the first surface. Furthermore, the third antenna includes a second curved metal bar disposed around a second corner of the electronic device adjacent to the first surface.

Example 19 is an electronic device with a broadband antenna system. The electronic device includes a first antenna including a straight metal bar disposed along a first surface of the electronic device and coupled to a first transceiver through a first indirect feed. The electronic device also includes a second antenna including a first curved metal bar disposed around a first corner of the electronic device adjacent to the first surface and coupled to a second transceiver through a second indirect feed. The electronic device also includes a third antenna including a second curved metal bar disposed around a second corner of the electronic device adjacent to the first surface and coupled to a third transceiver through a third indirect feed.

Example 20 includes the electronic device of example 19, including or excluding optional features. In this example, the first antenna is to operate at a first frequency range, and the second antenna and third antenna are to operate at a second frequency range higher than the first frequency range.

Example 21 includes the electronic device of any one of examples 19 to 20, including or excluding optional features. In this example, the first antenna operates in a dual loop mode through the second antenna and the third antenna.

Example 22 includes the electronic device of any one of examples 19 to 21, including or excluding optional features. In this example, the electronic device includes a first capacitive element coupling the straight metal bar of the first antenna to the first curved metal bar of the second antenna, and a second capacitive element coupling the straight metal bar of the first antenna to the second curved metal bar of the third antenna. Optionally, the first capacitive element and the second capacitive element are tunable to adjust a resonant frequency of the first antenna. Optionally, a first frequency range of the first antenna is covered in two switch stages, which are selectable by adjustment of the first capacitive element and the second capacitive element.

Example 23 includes the electronic device of any one of examples 19 to 22, including or excluding optional features. In this example, a first frequency range of the first antenna is between 699 MHz to 960 MHz.

Example 24 includes the electronic device of any one of examples 19 to 23, including or excluding optional features. In this example, the second antenna includes a first element configured to resonate at a frequency range between 1710 MHz and 2690 MHz, and a second element configured to resonate at a frequency range between 3400 and 3800 MHz.

Example 25 includes the electronic device of any one of examples 19 to 24, including or excluding optional features. In this example, the second antenna includes: a first element configured to resonate at a frequency range between 1710 MHz to 2690 MHz; a second element configured to resonate at a frequency range between 3400 and 3800 MHz; and a third element configured to resonate at a frequency range between 5150 and 5850 MHz. Optionally, the first element and second element are coupled to an indirect feed, and the third element is fed by the second element.

Example 26 is a method of manufacturing an electronic device with a broadband antenna system. The method includes disposing a first antenna including a straight metal bar along a top surface of the electronic device; disposing a second antenna including a first curved metal bar around a first corner of the electronic device adjacent to the top surface; disposing a third antenna including a second curved metal bar around a second corner of the electronic device adjacent to the first surface; coupling the first antenna to a first transceiver through a first indirect feed; coupling the second antenna to a second transceiver through a second indirect feed; and coupling the third antenna to a third transceiver through a third indirect feed.

Example 27 includes the method of example 26, including or excluding optional features. In this example, the first antenna is to operate at a first frequency range, and the second antenna and third antenna are to operate at a second frequency range higher than the first frequency range.

Example 28 includes the method of any one of examples 26 to 27, including or excluding optional features. In this example, the first antenna operates in a dual loop mode through the second antenna and the third antenna.

Example 29 includes the method of any one of examples 26 to 28, including or excluding optional features. In this example, the method includes coupling the straight metal bar of the first antenna to the first curved metal bar of the second antenna through a first capacitive element; and coupling the straight metal bar of the first antenna to the second curved metal bar of the third antenna through a second capacitive element. Optionally, the first capacitive element and the second capacitive element are tunable to adjust a resonant frequency of the first antenna. Optionally, a first frequency range of the first antenna is covered in two switch stages, which are selectable by adjustment of the first capacitive element and the second capacitive element.

Example 30 includes the method of any one of examples 26 to 29, including or excluding optional features. In this example, a first frequency range of the first antenna is between 699 MHz to 960 MHz.

Example 31 includes the method of any one of examples 26 to 30, including or excluding optional features. In this example, the second antenna includes: a first element configured to resonate at a frequency range between 1710 MHz and 2690 MHz; and a second element configured to resonate at a frequency range between 3400 and 3800 MHz.

Example 32 includes the method of any one of examples 26 to 31, including or excluding optional features. In this example, the second antenna includes: a first element configured to resonate at a frequency range between 1710 MHz to 2690 MHz; a second element configured to resonate at a frequency range between 3400 and 3800 MHz; and a third element configured to resonate at a frequency range between 5150 and 5850 MHz. Optionally, the first element and second element are coupled to an indirect feed, and the third element is fed by the second element.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A wireless device, comprising:
a first antenna configured to operate at a first frequency range, disposed substantially along a first surface of the wireless device, and coupled to a dedicated first transceiver that is dedicated to the first antenna;
a first feed path coupled between the first antenna and the dedicated first transceiver;
a second antenna configured to operate at a second frequency range, disposed at a location of the wireless device other than substantially along the first surface of the wireless device, and coupled to a dedicated second transceiver that is dedicated to the second antenna,
wherein the second antenna comprises a second additional antenna element which is coupled to be fed by a second indirect feed element, and a second parasitic antenna element configured to be driven by the second additional antenna element;
a second feed path coupled between the second antenna and the dedicated second transceiver, and comprising a second transmission line matching circuitry configured to impedance match an output of the second transceiver to the second antenna;
a third antenna configured to operate at a third frequency range, disposed at a location of the wireless device other than substantially along the first surface of the wireless device, and coupled to a dedicated third transceiver that is dedicated to the third antenna, wherein the third antenna comprises a third additional antenna element which is coupled to be fed by a third indirect feed element, and a third parasitic antenna element configured to be driven by the third additional antenna element; and a third feed path coupled between the third antenna and the dedicated third transceiver, and comprising a third transmission line matching circuitry configured to impedance match an output of the third transceiver to the third antenna, wherein each of the second frequency range and the third frequency range is higher than the first frequency range.

2. The wireless device of claim 1, wherein each of the first antenna, second antenna, and third antenna is disposed along an edge of the wireless device.

3. The wireless device of claim 2, wherein the second antenna is disposed at a corner of the wireless device, and the third antenna is disposed at another corner of the wireless device.

4. The wireless device of claim 3, wherein a bottom edge of the wireless device is located between the corner and the another corner.

5. The wireless device of claim 1, wherein the first antenna is disposed along a bottom edge of the wireless device.

6. The wireless device of claim 1, wherein:
the first antenna is coupled to the dedicated first transceiver by a first indirect feed element,
the second antenna is coupled to the dedicated second transceiver by a second indirect feed element, and
the third antenna is coupled to the dedicated third transceiver by a third indirect feed element.

7. The wireless device of claim 1, wherein:
the second antenna is coupled to ground by a second resonance inductor configured to tune a resonant frequency of the second antenna, and
the third antenna is coupled to ground by a third resonance inductor configured to tune a resonant frequency of the third antenna.

8. The wireless device of claim 1, wherein:
the first antenna is coupled to the second antenna by a second adjustable capacitor configured to select between switch stages of the first antenna, and
the first antenna is coupled to the third antenna by a third adjustable capacitor configured to select between the switch stages of the first antenna.

9. The wireless device of claim 8, further comprising:
an antenna system controller configured to vary capacitances of the second adjustable capacitor and the third adjustable capacitor.

10. The wireless device of claim 9, further comprising:
an impedance tuner coupled to an output of the first transceiver and to the antenna system controller, and configured to impedance match the dedicated first transceiver to the first antenna in response to changes in the switch stages of the first antenna.

11. The wireless device of claim 8, further comprising:
an impedance tuner coupled to an output of the first transceiver, and configured to impedance match the first transceiver to the first antenna.

12. The wireless device of claim 1, wherein:
the second additional antenna element is coupled to the second transceiver through the second transmission line matching circuitry and a fourth indirect feed element, and the third additional antenna element is coupled to the third transceiver through the third transmission line matching circuitry and a fifth indirect feed element.

13. The wireless device of claim 12, wherein:
the second additional antenna element is coupled to ground through a fourth inductor, and
the third additional antenna element is coupled to ground through a fifth inductor.

14. The wireless device of claim 13, wherein:
the parasitic second antenna element is coupled directly to ground, and
the parasitic third antenna element is coupled directly to ground.

15. The wireless device of claim 1, further comprising:
a chassis configured to selectively allow radiation on plane/direction.

16. The wireless device of claim 1, further comprising:
an antenna system controller configured to control a circuit element to tune the first antenna in response to changing conditions.

17. A wireless device, comprising:
a first antenna configured to operate at a first frequency range, and coupled to a dedicated first transceiver that is dedicated to the first antenna;
a first feed path coupled between the first antenna and the dedicated first transceiver;
a second antenna configured to operate at a second frequency range, and coupled to a dedicated second transceiver that is dedicated to the second antenna,
wherein the second antenna comprises a second additional antenna element which is coupled to be fed by a second indirect feed element, and a second parasitic antenna element configured to be driven by the second additional antenna element;
a second feed path coupled between the second antenna and the dedicated second transceiver, and comprising a second transmission line matching circuitry configured to impedance match an output of the second transceiver to the second antenna;
a third antenna configured to operate at a third frequency range, and coupled to a dedicated third transceiver that is dedicated to the third antenna,
wherein the third antenna comprises a third additional antenna element which is coupled to be fed by a third indirect feed element, and a third parasitic antenna element configured to be driven by the third additional antenna element; and
a third feed path coupled between the third antenna and the dedicated third transceiver, and comprising a third transmission line matching circuitry configured to impedance match an output of the third transceiver to the third antenna,
wherein each of the second frequency range and the third frequency range is higher than the first frequency range.

18. The wireless device of claim 17, wherein each of the first antenna, second antenna, and third antenna is disposed along an edge of the wireless device.

19. The wireless device of claim 17, wherein the first antenna is disposed along a bottom edge of the wireless device.

20. The wireless device of claim 17, further comprising:
a chassis configured to selectively allow radiation on plane/direction.

21. The wireless device of claim 17, further comprising:
an antenna system controller configured to control a circuit element to tune the first antenna in response to changing conditions.

22. A method of operating a wireless device, comprising:
- feeding a first antenna at a first frequency range using a dedicated first transceiver that is dedicated to and coupled to the first antenna, wherein there is a first feed path coupled between the first antenna and the dedicated first transceiver;
- feeding a second antenna at a second frequency range using a dedicated second transceiver that is dedicated to the second antenna; and
- feeding a second additional antenna element of the second antenna by a second indirect feed element, and driving a second parasitic antenna element by the second additional antenna element, wherein there is a second feed path coupled between the second antenna and the dedicated second transceiver;
- impedance matching, by a second transmission line matching circuitry, an output of the second transceiver to the second antenna;
- feeding a third antenna at a third frequency range using a dedicated third transceiver that is dedicated to the third antenna;
- feeding a third additional antenna element of the third antenna by a third indirect feed element, and driving a third parasitic antenna element by the third additional antenna element, wherein there is a third feed path coupled between the third antenna and the dedicated third transceiver; and
- impedance matching, by a third transmission line matching circuitry, an output of the third transceiver to the third antenna,
- wherein each of the second frequency range and the third frequency range is higher than the first frequency range.

23. The method of claim 22, wherein each of the first antenna, second antenna, and third antenna is disposed along an edge of the wireless device.

24. The method of claim 22, wherein the first antenna is disposed along a bottom edge of the wireless device.

25. The method of claim 22, wherein the wireless device comprises:
- a chassis configured to selectively allow radiation on plane/direction.

26. The method of claim 22, wherein the wireless device comprises:
- an antenna system controller configured to control a circuit element to tune the first antenna in response to changing conditions.

27. A wireless device, comprising:
- a first antenna means for operating at a first frequency range, and coupled to a dedicated first transceiving means that is dedicated to the first antenna means;
- a first feed path means coupled between the first antenna and the dedicated first transceiver;
- a second antenna means for operating at a second frequency range, and coupled to a dedicated second transceiving means that is dedicated to the second antenna means,
- wherein the second antenna means comprises a second additional antenna element means for being fed by a second indirect feed element means, and a second parasitic antenna element means for being driven by the second additional antenna element means;
- a second feed path means coupled between the second antenna means and the dedicated second transceiving means, and comprising a second transmission line matching means for impedance matching an output of the second transceiving means to the second antenna means;
- a third antenna means for operating at a third frequency range, and coupled to a dedicated third transceiving means that is dedicated to the third antenna means,
- wherein the third antenna means comprises a third additional antenna element means for being fed by a third indirect feed element means, and a third parasitic antenna element means for being driven by the third additional antenna element means; and
- a third feed path means coupled between the third antenna means and the dedicated third transceiving means, and comprising a third transmission line matching means for impedance matching an output of the third transceiving means to the third antenna means,
- wherein each of the second frequency range and the third frequency range is higher than the first frequency range.

28. The wireless device of claim 27, wherein each of the first antenna means, second antenna means, and third antenna means is disposed along an edge of the wireless device.

29. The wireless device of claim 27, wherein the first antenna means is disposed along a bottom edge of the wireless device.

30. The wireless device of claim 27, further comprising:
- a chassis configured to selectively allow radiation on plane/direction.

31. The wireless device of claim 27, further comprising:
- an antenna system controlling means for controlling a circuit element to tune the first antenna in response to changing conditions.

* * * * *